(12) United States Patent
Yang (10) Patent No.: US 10,755,592 B2
(45) Date of Patent: *Aug. 25, 2020

(54) FACILITATING DIAGNOSIS AND CORRECTION OF OPERATIONAL PROBLEMS

(71) Applicant: Tutor Group Limited, Taipei (TW)

(72) Inventor: Cheng-Ta Yang, Taipei (TW)

(73) Assignee: TUTOR GROUP LIMITED, Hong Kong (CN)

( * ) Notice: Subject to any disclaimer, the term of this patent is extended or adjusted under 35 U.S.C. 154(b) by 211 days.

This patent is subject to a terminal disclaimer.

(21) Appl. No.: 15/379,449

(22) Filed: Dec. 14, 2016

(65) Prior Publication Data

US 2017/0098379 A1 Apr. 6, 2017

Related U.S. Application Data

(63) Continuation-in-part of application No. 15/236,377, filed on Aug. 12, 2016, now Pat. No. 10,586,296, (Continued)

(30) Foreign Application Priority Data

Jul. 24, 2009 (TW) .............................. 98125108 A (51) Int. Cl.
*G09B 5/14* (2006.01)
*G09B 5/06* (2006.01)
(Continued)

(52) U.S. Cl.
CPC ............ *G09B 5/14* (2013.01); *G06K 9/00711* (2013.01); *G06Q 30/02* (2013.01);
(Continued)

(58) Field of Classification Search
CPC .......... G09B 25/14; G09B 27/00; G09B 7/00; G06Q 10/10; G06Q 30/02; G08B 27/00
See application file for complete search history.

(56) References Cited

U.S. PATENT DOCUMENTS 5,727,950 A 3/1998 Cook et al.
5,823,788 A 10/1998 Lemelson et al.
(Continued)

FOREIGN PATENT DOCUMENTS

CN 1420448 A 5/2003
CN 1591516 A 3/2005
(Continued)

OTHER PUBLICATIONS

Taiwan Patent Application No. 098125108, "Office Action", dated Apr. 28, 2014, 5 pages (including 1 page English translation of marked portion of pp. 2-3 of Office Action ).
(Continued)

*Primary Examiner* — Robert J Utama
(74) *Attorney, Agent, or Firm* — Carr & Ferrell LLP (57) ABSTRACT

An online learning management system for monitoring and maintaining operational integrity of online teaching groups having users distributed across a network is disclosed. The system includes a managing interface, a teaching module, an analyzing module, a managing module, and a monitoring module. The teaching module is configured to manage communications between computing devices of the users. The analyzing module is configured to detect operational problems and disturbances. The managing module is configured to receive messages from the analyzing module, remove a user experiencing the operational problem or disturbance, insert the user into a managing area, facilitate diagnosis and correction of the operational problem or disturbance, and return the user when the operational problem or disturbance has been corrected. The monitoring
(Continued)

module is configured to monitor connection status data of the computing devices, determine if the connection status is unstable, and record the connection status data of the user.

20 Claims, 7 Drawing Sheets

Related U.S. Application Data which is a continuation of application No. 12/837,555, filed on Jul. 16, 2010, now abandoned.

(51) Int. Cl.
| | |
|---|---|
| G09B 19/06 | (2006.01) |
| G09B 5/00 | (2006.01) |
| G09B 7/00 | (2006.01) |
| H04L 12/26 | (2006.01) |
| H04L 29/06 | (2006.01) |
| G10L 15/26 | (2006.01) |
| G06K 9/00 | (2006.01) |
| G06Q 50/20 | (2012.01) |
| G06Q 30/02 | (2012.01) |
| H04L 12/18 | (2006.01) |

(52) U.S. Cl.
CPC ......... *G06Q 30/0271* (2013.01); *G06Q 50/20* (2013.01); *G09B 5/00* (2013.01); *G09B 5/065* (2013.01); *G09B 7/00* (2013.01); *G09B 19/06* (2013.01); *G10L 15/265* (2013.01); *H04L 12/185* (2013.01); *H04L 12/1822* (2013.01); *H04L 43/065* (2013.01); *H04L 43/0817* (2013.01); *H04L 65/1083* (2013.01); *H04L 65/403* (2013.01); *G06K 2009/00738* (2013.01)

(56) References Cited

U.S. PATENT DOCUMENTS

| | | | |
|---|---|---|---|
| 5,957,699 A | 9/1999 | Peterson et al. | |
| 5,978,648 A | 11/1999 | George et al. | |
| 6,024,577 A | 2/2000 | Wadahama et al. | |
| 6,029,043 A * | 2/2000 | Ho | G09B 5/065 |
| | | | 273/432 |
| 6,064,856 A | 5/2000 | Lee et al. | |
| 6,141,529 A | 10/2000 | Remschel | |
| 6,160,987 A | 12/2000 | Ho et al. | |
| 6,164,974 A | 12/2000 | Carlile et al. | |
| 6,261,103 B1 | 7/2001 | Stephens et al. | |
| 6,282,404 B1 | 8/2001 | Linton | |
| 6,302,698 B1 | 10/2001 | Ziv-El | |
| 6,325,632 B1 | 12/2001 | Chao et al. | |
| 6,505,031 B1 | 1/2003 | Slider et al. | |
| 6,554,618 B1 | 4/2003 | Lockwood | |
| 6,606,744 B1 | 8/2003 | Mikurak | |
| 6,615,020 B2 | 9/2003 | Richter et al. | |
| 6,652,287 B1 | 11/2003 | Strub et al. | |
| RE38,432 E * | 2/2004 | Fai | G09B 5/065 |
| | | | 273/432 |
| 6,758,754 B1 | 7/2004 | Lavanchy et al. | |
| 6,760,748 B1 | 7/2004 | Hakim | |
| 6,813,474 B2 | 11/2004 | Robinson et al. | |
| 7,124,101 B1 | 10/2006 | Mikurak | |
| 7,305,465 B2 * | 12/2007 | Wing | G06Q 10/06 |
| | | | 707/999.01 |
| 7,516,180 B2 | 4/2009 | Lacy | |
| 7,860,736 B2 | 12/2010 | Draper et al. | |
| 7,908,602 B2 * | 3/2011 | Alcorn | G06Q 30/06 |
| | | | 709/219 |
| 8,172,578 B2 | 5/2012 | Clark et al. | |
| 8,435,038 B2 | 5/2013 | Wilson et al. | |
| 2002/0055089 A1 | 5/2002 | Scheirer | |
| 2002/0064767 A1 | 5/2002 | McCormick et al. | |
| 2002/0146675 A1 | 10/2002 | Koga et al. | |
| 2002/0182578 A1 | 12/2002 | Rachman et al. | |
| 2002/0188583 A1 | 12/2002 | Rukavina et al. | |
| 2003/0028378 A1 * | 2/2003 | August | G09B 5/04 |
| | | | 704/260 |
| 2003/0028588 A1 * | 2/2003 | McConnell | G09B 7/00 |
| | | | 709/203 |
| 2003/0036046 A1 * | 2/2003 | Smolover | G09B 5/00 |
| | | | 434/350 |
| 2003/0039948 A1 | 2/2003 | Donahue | |
| 2003/0044761 A1 | 3/2003 | Houlihan et al. | |
| 2003/0152904 A1 | 8/2003 | Doty | |
| 2003/0186208 A1 | 10/2003 | Wen et al. | |
| 2004/0002040 A1 | 1/2004 | Foley et al. | |
| 2004/0009461 A1 | 1/2004 | Snyder et al. | |
| 2004/0110119 A1 | 6/2004 | Riconda et al. | |
| 2004/0131999 A1 | 7/2004 | Dresnick | |
| 2004/0139156 A1 * | 7/2004 | Matthews | G09B 7/00 |
| | | | 709/204 |
| 2004/0153508 A1 | 8/2004 | Alcorn et al. | |
| 2004/0229199 A1 | 11/2004 | Ashley et al. | |
| 2004/0234937 A1 | 11/2004 | Watanabe | |
| 2005/0026131 A1 | 2/2005 | Elzinga et al. | |
| 2006/0035206 A1 | 2/2006 | Clark et al. | |
| 2006/0172274 A1 | 8/2006 | Nolasco | |
| 2006/0174121 A1 | 8/2006 | Omae et al. | |
| 2007/0096894 A1 * | 5/2007 | Lemmon | G08B 25/14 |
| | | | 340/506 |
| 2008/0043626 A1 * | 2/2008 | Pham | H04L 41/12 |
| | | | 370/241 |
| 2008/0172574 A1 * | 7/2008 | Fisher | G06Q 10/06 |
| | | | 714/25 |
| 2009/0035733 A1 * | 2/2009 | Meitar | G09B 7/00 |
| | | | 434/118 |
| 2009/0307612 A1 * | 12/2009 | Singh | G06Q 10/10 |
| | | | 715/758 |
| 2010/0159432 A1 | 6/2010 | German et al. | |
| 2011/0020781 A1 | 1/2011 | Yang | |
| 2015/0067052 A1 * | 3/2015 | Bounds | H04L 51/12 |
| | | | 709/204 |
| 2016/0350888 A1 | 12/2016 | Yang | |
| 2017/0098379 A1 * | 4/2017 | Yang | G06Q 30/0271 |
| 2017/0221371 A1 | 8/2017 | Yang | |

FOREIGN PATENT DOCUMENTS

| | | |
|---|---|---|
| CN | 101154320 A | 4/2008 |
| CN | 207037604 U | 2/2018 |
| JP | 3212833 U | 10/2017 |
| TW | 200516450 A | 5/2005 |
| TW | I249112 A | 2/2006 |
| TW | 200832298 A | 8/2008 |
| TW | 201104645 A | 2/2011 |
| TW | M549381 U | 9/2017 |
| TW | I622026 B | 4/2018 |

OTHER PUBLICATIONS

Non-final Office Action, dated Jul. 12, 2012, U.S. Appl. No. 12/837,555, filed Jul. 16, 2010.

Final Office Action, dated Jun. 11, 2013, U.S. Appl. No. 12/837,555, filed Jul. 16, 2010.

Non-final Office Action, dated May 21, 2014, U.S. Appl. No. 12/837,555, filed Jul. 16, 2010.

Non-final Office Action, dated Sep. 30, 2014, U.S. Appl. No. 12/837,555, filed Jul. 16, 2010.

Final Office Action, dated Mar. 25, 2015, U.S. Appl. No. 12/837,555, filed Jul. 16, 2010.

Non-final Office Action, dated Sep. 30, 2015, U.S. Appl. No. 12/837,555, filed Jul. 16, 2010.

Final Office Action, dated Apr. 12, 2016, U.S. Appl. No. 12/837,555, filed Jul. 16, 2010.

* cited by examiner

FACILITATING DIAGNOSIS AND CORRECTION OF OPERATIONAL PROBLEMS

CROSS REFERENCE TO RELATED APPLICATIONS

This application is a continuation-in-part and claims the priority benefit of U.S. patent application Ser. No. 15/236,377, filed on Aug. 12, 2016, which in turn is a continuation of and claims the priority benefit of U.S. patent application Ser. No. 12/837,555, filed on Jul. 16, 2010, which claims the priority benefit of Taiwan Patent Application No. 098125108, filed on Jul. 24, 2009, which are hereby incorporated by reference herein in their entirety, including all references and appendices cited therein.

FIELD OF THE INVENTION

The present disclosure relates to methods and systems for facilitating diagnosis and correction of operational problems, and more particularly, it relates to facilitating the diagnosis and correction of operational problems that arise in online teaching groups consisting of users distributed across a network.

BACKGROUND

People usually read books and other information to learn different languages, and the most effective way is to attend language courses in schools. Learners improve their language abilities by communicating with teachers. However, the language courses are usually scheduled for a fixed duration of time, which makes it very inconvenient for learners to arrange and allocate time, daily or weekly, for these courses. As a result, many interested learners eventually abandon their plans to learn a new language.

With the advancement of technology, transmission speed over the Internet has increased throughout the years. Therefore, people are beginning to learn new languages via the Internet due to convenience. No matter where the learners are located, the learners may download video clips recorded by the teachers via the Internet. To achieve maximum learning results, learners may also directly communicate with each other by video software. With this learning method, the learning process is no longer restricted by the place and the time of the language courses. However, learning by watching video clips is very similar to learning by reading books. Furthermore, the function of the video software is limited. As a result, the abovementioned learning method is not as effective as communicating with the teacher in the actual courses.

Moreover, due to the lack of management functions of traditional learning systems, Internet learners may only contact the system administrator via telephone or email when problems occur. The administrator may try to determine the problems from the descriptions provided by the learners, but the solutions to the problems may not be found in real time. Therefore, it is important to develop a system which is able to provide user convenience and allow effective learning. At the same time, the system must be efficient and manageable for the system administrators.

SUMMARY

It is an objective of the present disclosure to provide an online interactive learning and managing system for users to learn interactively via the Internet and such a system that administrators can manage easily. To achieve the above objective, an online interactive learning and managing system of the present disclosure comprises a server which enables a plurality of users to log in via the Internet, and allocates the logged-in users to create at least one teaching group. The server comprises a processor and a memory electrically coupled with the processor. The memory comprises a software program which is executed by the processor. The software program comprises a teaching module, a managing module, and an analyzing module. The teaching module is used to form each operation interface corresponding to each teaching group. The operation interface loads each set of personal settings corresponding to each user of the teaching group to form each personalized operation interface for interactive learning by each user, wherein the operation interface includes a speaking switch to allow the user to speak to the teaching group in real time and a video switch to allow the user to view and be visible to other users in real time.

The managing module forms a managing interface for management of the plurality of users by an administrator, wherein the managing module may receive any message sent from the operation interface of the teacher or the at least one learner to display the message on the managing interface in real time. The teaching module may receive any message sent from the managing interface and display the message on the operation interface of the teacher or the at least one learner in real time. The administrator and each user may thus communicate with each other in real time.

In various embodiments, the analyzing module analyzes speaking time of the teacher and of each learner to produce speaking information and transmits the speaking information to the managing module and the teaching module. The analyzing module may further convert the speaking information into a live speech-to-text transcript. In certain embodiments, the analyzing module also analyzes video imaging of the learner to produce video information and transmits the video information to the managing module and the teaching module.

Accordingly, the online interactive learning and managing system of the present disclosure enables the users to log in, and forms each personalized operation interface corresponding to each user for interactive learning. The administrator may monitor and manage each user via the managing interface. Each user and the administrator are able to communicate with each other via the personalized operation interface and the managing interface. It is more convenient for teaching and managing.

BRIEF DESCRIPTION OF THE DRAWINGS

These and other objectives and advantages of the present disclosure will become apparent from the following description of the accompanying drawings, which disclose several embodiments of the present disclosure. It is to be understood that the drawings are to be used for purposes of illustration only, and not as a definition of the invention. In the drawings, similar reference numerals denote similar elements throughout the several views.

DETAILED DESCRIPTION

Figure 1:
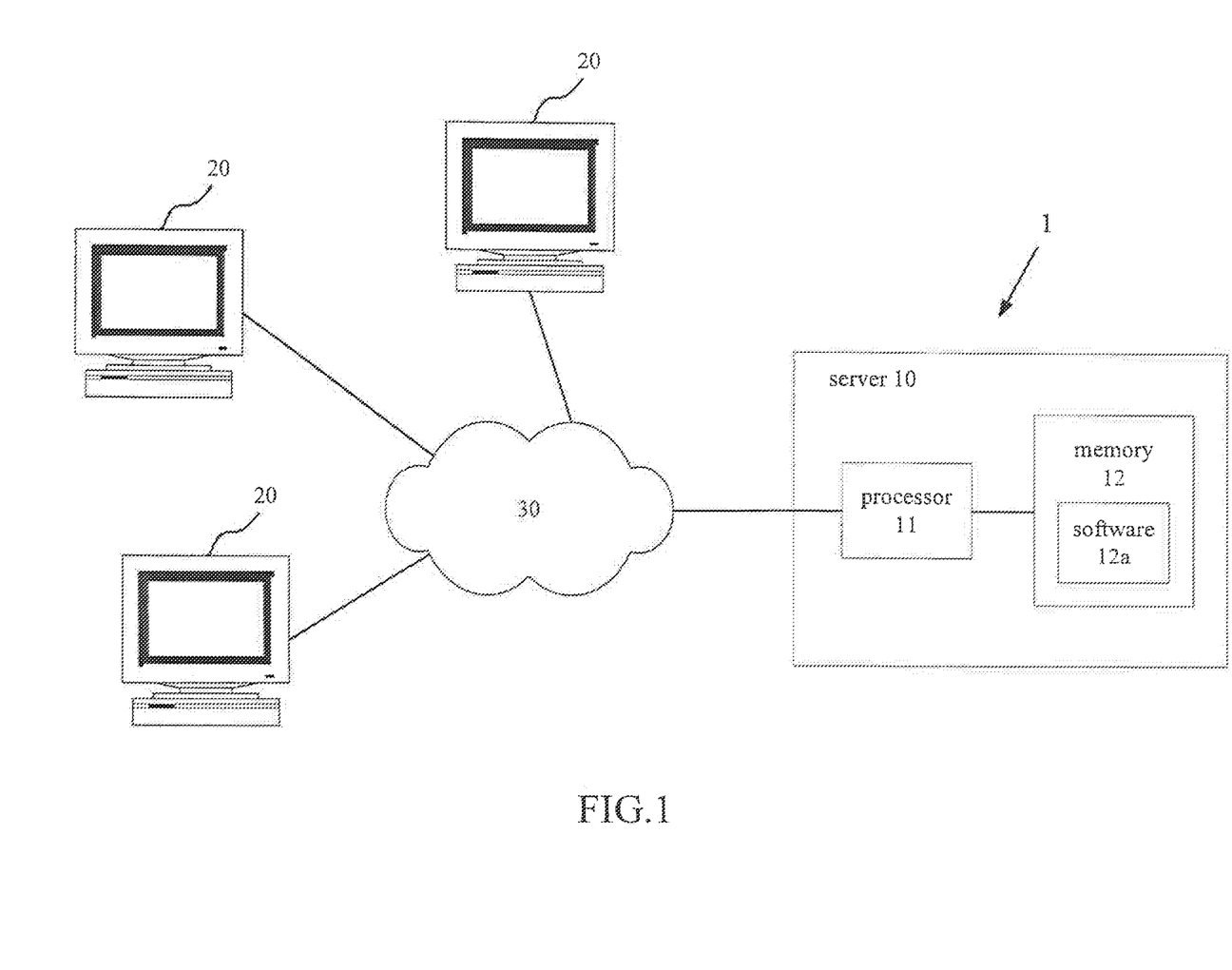
FIG. 1 is a schematic diagram of the online interactive learning and managing system of the present disclosure.

Please refer to FIG. 1, which is a schematic diagram of an online interactive learning and managing system of the present disclosure. As shown in FIG. 1, an online interactive learning and managing system 1 of the present disclosure comprises a server 10. A plurality of users may log in the server 10 via the Internet 30 with each user's computer 20, and then may utilize the online interactive learning and managing system 1 of the present disclosure to proceed with interactive learning. The server 10 comprises a processor 11 and a memory 12 electrically coupled with the processor 11. The memory 12 comprises a software program 12a, which is executed by the processor 11 and activates the learning and managing functions.

In one or more embodiments, the software program 12a is coded in flash language. Each user needs only to use the computer 20 to log into the server 10 of the online interactive learning and managing system 1 via the Internet. The related operational interfaces may be formed and displayed via the computer 20. Therefore, each user does not have to install corresponding software in the computer 20. However, the present disclosure is not restricted to this method.

Figure 2:
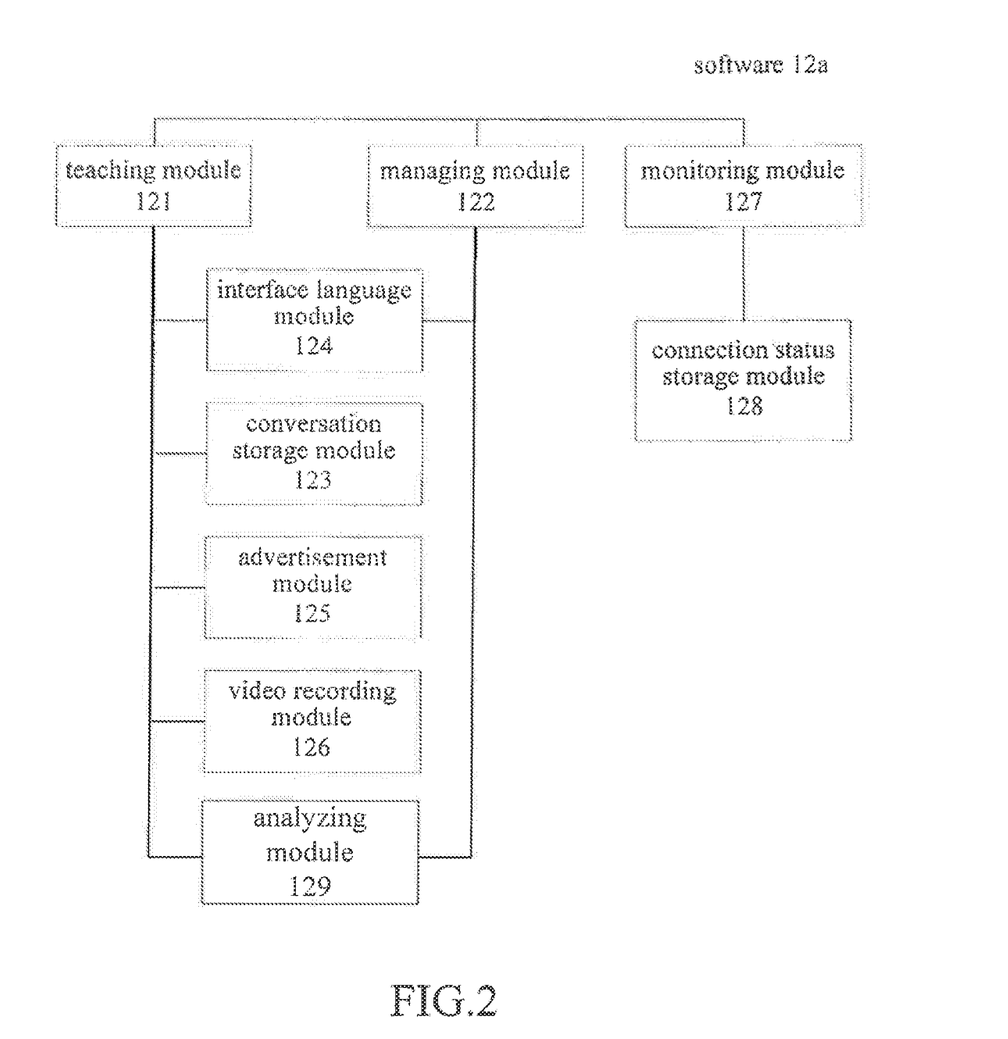
FIG. 2 is a schematic diagram showing a composition structure of a software program of the online interactive learning and managing system of the present disclosure.
Figure 3:
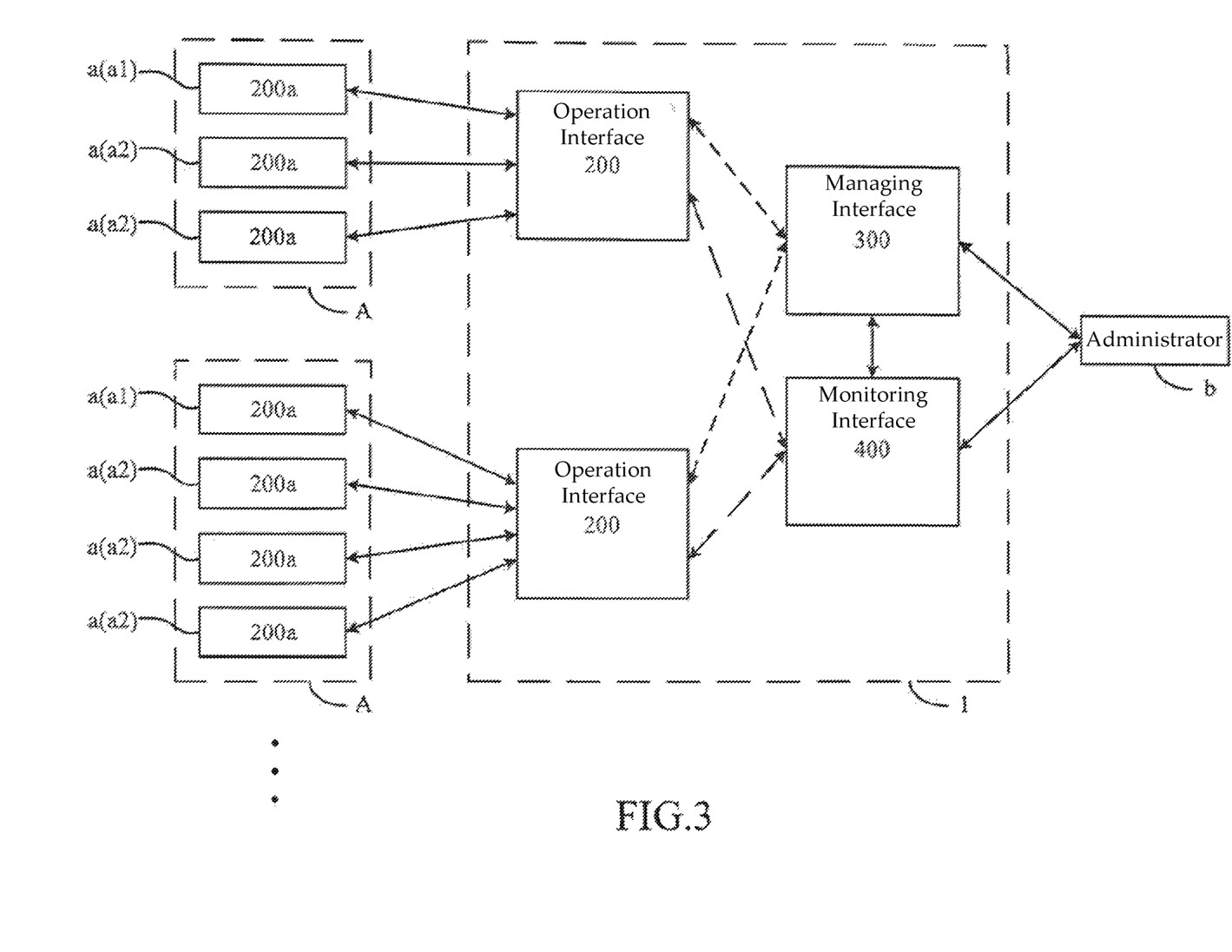
FIG. 3 is a schematic diagram showing an established connection status of the online interactive learning and managing system of the present disclosure.

Please refer to FIG. 2 and FIG. 3. FIG. 2 is a schematic diagram showing a composition structure of a software program 12a of the online interactive learning and managing system 1. FIG. 3 is a schematic diagram showing an established connection status of the online interactive learning and managing system 1. Information of each user is stored in the respective computer 20 of the user. When a user "a" logs into the online interactive learning managing system 1, the software program 12a will retrieve the information of the user from the computer 20 corresponding to the user, and will allocate the user "a" to a predetermined teaching group "A" after comparing the information with course category data. The course category data is pre-loaded into the memory 12. All users may be allocated to form at least one teaching group "A" according to at least one of: the number of users "a," different language levels of the users, and different identities of the users. Each teaching group "A" is composed of a plurality of users "a," and each teaching group "A" comprises one teacher "a1" and at least one learner "a2." The related technique of categorizing the users according to the information of each user is disclosed in Taiwan patent No. 1249112.

As shown in FIG. 2 and FIG. 3, the software program 12a comprises a teaching module 121, a managing module 122, and an analyzing module 129. The teaching module 121 forms an operation interface 200 corresponding to each teaching group "A," such that each teaching group "A" may proceed with interactive learning. The information of each user "a" comprises personal settings. When the operation interface 200 is formed, the operation interface 200 loads the personal settings of each user "a" and forms a personalized operation interface 200a. The operation interface 200 displays the personalized operation interface 200a on each respective computer 20. Each user may communicate and learn with other users of the same teaching group "A" via the personalized interface 200a.

Furthermore, according to the different personal settings that are loaded, e.g. the personal settings of a teacher or a learner, the teaching module 121 may categorize each personalized operation interface 200a into a teacher's operational interface or a learner's operational interface. The different operational interfaces for teachers and learners have respective interface operation authorization levels. Via the operation interface 200, the users in the same teaching group can see each other via video and talk to each other.

The managing module 122 forms a managing interface 300, which allows an administrator "b" to manage the plurality of users "a" and to control the teaching and learning situation of each teaching group "A." When something needs to be communicated between the administrator "b" and a user "a," the administrator "b" and the user "a" may communicate with each other via the managing interface 300 and the personalized operation interface 200a, respectively. The user "a" may send messages via the personalized operation interface 200a, and the managing module 122 may receive messages for display on the managing interface 300 for notifying the administrator "b." The administrator "b" may also send messages via the managing interface 300, and the teaching module 121 may receive the messages for display on the personalized operation interface 200a of any designated single or multiple users "a."

In one or more embodiments, the analyzing module 129 produces speaking information corresponding to a user. The analyzing module 129 receives an audio signal from a microphone coupled to the computer 20 of the user. The analyzing module 129 determines whether or not the user is speaking, via voice activity detection or other voice recognition method, versus when the audio signal only comprises background noise. The analyzing module 129 calculates a length of time that the user speaks based on the voice activity detection. The analyzing module 129 compares the length of time that the user speaks with a length of time other users speak. It is to be understood that the length of time other users speak is similarly calculated by the analyzing module 129 based upon at least one audio signal received from a microphone coupled to the computer 20 of each respective user. The analyzing module 129 produces the speaking information according to the results of the comparison. The speaking information may further include a ratio of a speaking time of the user to a speaking time of the teacher per minute, as well as a ratio of the speaking time of the user to a speaking time of a different user per minute.

The analyzing module 129 transmits the speaking information to the teaching module 121 and the managing module 122. According to the speaking information, the teacher, the learner, and the administrator may improve the teaching and learning effects. The speaking information is updated in real time, so the user may improve a teaching or learning way immediately.

In some embodiments, the analyzing module 129 further analyzes the audio signal and converts user speech contained within the audio signal into a speech-to-text transcript. The speaking information may also include the speech-to-text transcript. In certain embodiments, the analyzing module 129 detects a language of the user. The analyzing module 129 then translates the transcript into the detected language or into a different language. Furthermore, the analyzing module 129 may auto-tag certain terms or text within the speech-to-text transcript.

In one or more embodiments, the analyzing module 129 produces video information corresponding to a user. In various embodiments, the analyzing module 129 receives a video signal from a camera coupled to the computer 20 of the user. A user, via the personalized operation interface 200A, may activate a video function in which a video received from the camera is transmitted to the personalized operation interface 200A of other users in real time. In various embodiments, the analyzing module 129 analyzes the face of the user via facial recognition. The analyzing module 129 determines whether or not the user is causing a disturbance (e.g. determining whether or not the user is paying attention, has fallen asleep, or is talking) based on the analysis via the facial recognition. In certain embodiments, the analyzing module 129 generates a notifying message indicative of the disturbance of the user and transmits the notifying message to the managing module 122. Furthermore, the analyzing module 129 produces the video information based on the analysis via the facial recognition and transmits the video information to the teaching module 121 and the managing module 122. According to the video information, the teacher, the learner, and the administrator may improve the teaching and learning effects.

In some embodiments, the analyzing module 129 determines whether a microphone or audio of the computer 20 of the user is working properly based on at least one of the video information and the speaking information. For example, in one or more embodiments, the analyzing module 129 determines both that a user is talking based on the video information, and also that no audio signal was received from the microphone of the user (e.g. the computer 20 of the user transmitted no audio signal, or the received audio signal was empty). The determination indicates an issue with the microphone. Based on the determination, the analyzing module 129 thus automatically generates a notifying message indicative of the microphone issue. The analyzing module 129 then transmits the notifying message to the managing module 122. In other embodiments, the analyzing module 129 can send the notifying message directly to the user.

In some embodiments, the personal settings include at least one of interface function settings, data input authorization settings, and user information settings. The interface function settings correspond to the settings of the personalized operation interface 200a displayed on the user's computer 20. The interface function settings may comprise interface language settings, time settings, video settings, and sound settings. The data input authorization settings are related to the input operation authorization settings of the personal operation interface 200a for the user "a." The input operating authorization settings comprise a character input authorization, a sound input authorization, or an interaction input authorization. The user information settings include the display name, hobbies, and other related settings of the user "a."

When the user "a" logs into the on-line interactive learning and managing system 1, the personal settings of the user "a" are also loaded. The language displayed on the personalized operation interface 200a may be changed according to different interface language settings. For example, the interface language may be displayed in, at least, simplified Chinese characters, traditional Chinese characters, or English letters. The time settings determine the time information being displayed on the personalized operation interface 200a. According to the different time settings, a local time of the user or/and a local time of the server may be displayed separately or simultaneously. It is convenient for the user to check the correct timing of the course from wherever the user logs in.

The video settings determine whether a video camera of the user is on or off, and whether to display the video images received from the video camera on the personalized operation interface 200a. The sound settings determine whether a microphone of the user is on or off, and determine a volume of sound from an output device (e.g. amplifiers), or an input device (e.g. microphones). The personalized operation interface 200a may be customized according to the interface function settings so that each user "a" may learn interactively via an interface with which he or she is most familiar.

The interface function settings may be changed through the personal operation interface 200a. The software program 12a may automatically save the changed interface function settings as the personal settings. The software program 12a will load the new personal settings, and will update the personal operation interface 200a on the next occasion when the user "a" logs into the online interactive learning and managing system 1.

The character input authorization of the data input authorization settings determines whether the user "a" is able to input characters in the personalized operation interface 200a. The sound input authorization determines whether the user "a" is able to transmit a sound signal through the microphone to other users "a" of the same teaching group "A." The interaction input authorization determines whether the user "a" is able to use teaching display data (such as teaching materials) for operating interactively via the personalized operation interface 200a. The personal settings corresponding to different identities of the users are different, so the data input authorization of the personalized operation interface 200a for each user "a" is different. For example, when the user "a" is a teacher "a1," the default of all of the data input authorization of the user "a" may be activated for teaching. When the user "a" is a learner "a2," the user need only to listen, talk, and input characters to communicate with teacher "a1" and other learners "a2." The learner "a2" may not need to utilize the interaction input authorization, which is only utilized by the teacher "a1," and the default of the interaction input authorization should be closed for learner "a2." The default of the data input authorization in the above description may be adjusted according to different system requirements. However the present disclosure is not restricted to this method.

Furthermore, when the user "a" logs in, a nickname defined by the user "a" may be displayed on the personalized operation interface 200a according to the user information settings. Each user "a" may address one another with said nickname. The nickname of the user "a" is distinct from the account name of the user "a."

Figure 4:
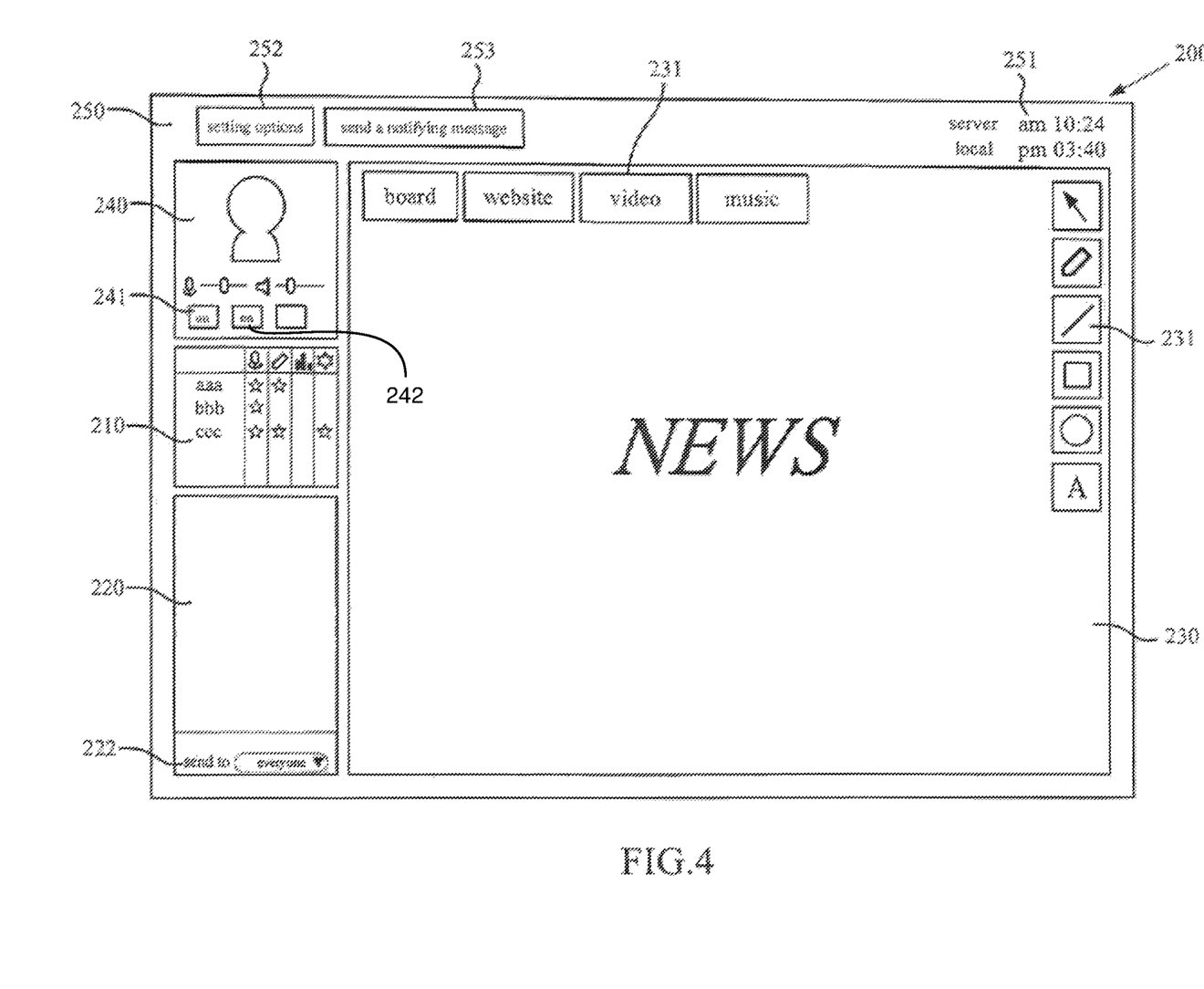
FIG. 4 is a schematic diagram showing a personalized operation interface of the online interactive learning and managing system of the present disclosure.

Please refer to FIG. 2 and FIG. 4. FIG. 4 is a schematic diagram showing a personalized operation interface 200a of the online interactive learning and managing system of the present disclosure. As shown in FIG. 2 and FIG. 4, each personalized operation interface 200a formed by the teaching module 121 comprises a status display area 210, a real-time communication area 220, an interactive display area 230, a video display area 240, and an interface function settings area 250.

The status display area 210 displays status information of each user, the status information comprising a user connection status, a user identity status, or an input authorization status. The user connection status determines whether an Internet connection of the computer 20 of the user is stable. The user identity status is used for confirming an identity of the user. The input authorization status determines the data input authorization of the user. Accordingly, the status information of each user of the same teaching group may be displayed in the status display area 210. The status display area 210 of the teacher's operation interface 200a also displays the speaking information and the video information. According to the speaking information and the video information, the teacher can decide to change or maintain the teaching style and focus attention on a learner who is speaking less or who is not paying attention. However, the present disclosure is not only limited to these types of information.

The real-time communication area 220 displays the text messages typed by the users of the same teaching group, which allows two or more users to communicate with each other. The text messages typed by each user in the real-time communication area 220 may be sent via a function option 222 to specific users, such as the teacher or a specific learner, or to all users of the same teaching group, and the messages may be sent in a private or public manner. The user may also communicate with the administrator directly through text messages. As shown in FIG. 2 and FIG. 4 of the on-line interactive learning and managing system 1, the software program 12a further comprises a conversation storage module 123, which is used to save all message conversations that each user has entered as text in the real-time communication area 220 of the personalized operation interface 200a. As a result, the text messages of the conversations can be searched in the future if needed.

In some embodiments, the interactive display area 230 provides a digital white-board, which is collaboratively shared between users. The interactive display area 230 may comprise multiple displays, each display having at least one of the speech-to-text transcripts, the digital white-board, Internet web pages, etc. The users create various layouts for the displays, via the personalized operation interface 200A, the displays being movable and resizable according to the user's preferences. The teaching module 121 may load teaching display data and display the data on the interactive display area 230 of the personalized operation interface 200a.

In certain embodiments, the teaching display data is provided by the teacher with the interaction input authorization. The teaching display data may be selected and operated (such as inputting characters, footnoting, or drawing lines on the teaching display data) by a function bar 231 of the interactive display area 230. The learner whose interaction input authorization is active may also use the related function of the interactive display area 230. The teaching display data may comprise documents (such as documents generated in word-processing software or digital slideshow files), web data, or multimedia files (such as video or audio files). Furthermore, the teaching display data corresponding to each teaching group may be pre-loaded by the system onto the interactive display area 230 of each personalized operation interface 200a, and each learner may preview the teaching display data.

The video display area 240 displays video images captured from a camera coupled to the teacher's computer. For example, a webcam may capture a real-time video of the teacher to simulate the situation of face-to-face teaching and learning. The video display area 240 comprises a video switch 241, which allows users to activate or disable at least one of the video images displayed on the video display area 240 and the camera of the user.

The video display area 240 further comprises a speaking switch 242. When the user turns the speaking switch 242 to an on state, the teaching group can hear the voice from the user's microphone. In contrast, when the speaking switch 242 is in the off state, the teaching group cannot hear any voice from the user's microphone. The video display area 240 allows users to activate or disable the audio input/output, and adjust the volume of the audio input/output. For example, if the user activates the video image while the network is congested, the image transmission may be delayed. In such a case, the user may choose to disable the video images and audio in order to allow the personalized operation interface 200a to operate more swiftly.

The interface function settings area 250 provides options and display of some interface functions, and the functions comprise a time display 251, an interface function option 252, and a communication assistance function option 253. The time display 251 is set in accordance with the personal settings, and the corresponding time is displayed. The user may check the actual time of the course, independent of where the user is located. The interface function option 252 may be used for adjusting the related functions of the personalized interface 200a, and it comprises the options of the interface language settings or the time settings. The user may scroll down the option list to choose the options for the adjustments.

The software program 12a further comprises an interface language module 124, and the interface language module 124 stores multiple interface languages. The language displayed on the personalized operation interface 200a may be changed via the interface function settings area 250 of the personalized operation interface 200a. For example, the predefined language setting in the personalized operation interface 200a is traditional Chinese. When a user's first language is English, the language on the personalized operation interface 200a may be changed to English by the interface function settings area 250. The change of the interface language settings is stored in the user's personal settings, and the personalized operation interface 200a will retain its English interface if the language setting remains unchanged.

The communication assistance function option 253 allows the learners to respond to the teacher regarding the problems in learning, or allows the learners or the teacher to respond to the administrator regarding the problems in using the interface, and reminds the administrator to respond to the problems. Using the communication with the administrator as an example, any learner or teacher may choose the most appropriate option of a set of options via the communication assistance function option 253 when a problem arises (such as if there are delays in communication, or if the audio cannot be heard), or directly type text messages to notify the administrator regarding the problem. A notifying message may be sent to the managing module 122 according to the messages typed or the option chosen by any learner or teacher via the personalized operation interface 200a. Then, the managing module 122 may display a prompting message corresponding to the notifying message on the managing interface 300 to remind the administrator to solve the problem.

In various embodiments, the teacher's operation interface comprises at least one control coupled to the data input authorization of each learner. The teacher may alter the data input authorization setting of any learner's operation interface via the teacher's operation interface to ensure the convenience of teaching and to prevent some users from trying to disturb the course. The teacher may evaluate the situation of the course and change any learner's data input authorization settings via the teacher's operation interface. For example, when a learner wants to share a document or a video during the course, the teacher may activate the learner's interaction input authorization such that the learners may provide and display related files in the interactive display area 230. If a learner attempts to disrupt the course by sending inappropriate, vulgar, or irrelevant messages in the real-time communication area 220, the teacher may disable that learner's character input authorization to stop the disruption.

The software program 12a further comprises an advertisement module 125 that stores multiple advertisement data. When the personalized operation interface 200a is formed, the software program 12a combines at least one advertisement data with the corresponding personalized operation interface 200a via the advertisement module 125. The user may see the at least one advertisement data when using the personalized operation interface 200a. The advertisement module 125 chooses a suitable advertisement data to combine with each personalized operation interface 200a according to special events or the user's personal settings, e.g. the teaching group for each user, identity, or personal information. For example, a user may store data on hobbies in the personal information settings, such as "movies" or "electronic products." Accordingly, the advertisement module 125 may choose a corresponding movie trailer or an advertisement for electronic products, and combine it with the user's personalized operation interface 200a, so that the users will receive additional information during the course.

The software program 12a further comprises a video recording module 126, which is used for recording the teaching process of each teaching group via the operating interface 200 to form recording files. In various embodiments, the video recording module 126 first receives a signal from the teacher's computer that the camera has been activated. In response, the video recording module 126 records video of the teacher into a memory, and transmits the video to at least one learner. In response to the teaching module 121 forming an operation interface 200 for any respective teaching group, the video recording module 126 activates and records the teaching process of the teaching group, as well as recording the operations and video data of the operation interface 200. Therefore, the learners who could not attend the course or want to review the class may view the recording files of the course after the course has ended. Furthermore, when the users log into the server to view the recording files, the advertisement module 125 may also choose a suitable advertisement data according to each user's personal information settings and insert the advertisement data into the recording files.

Figure 5A:
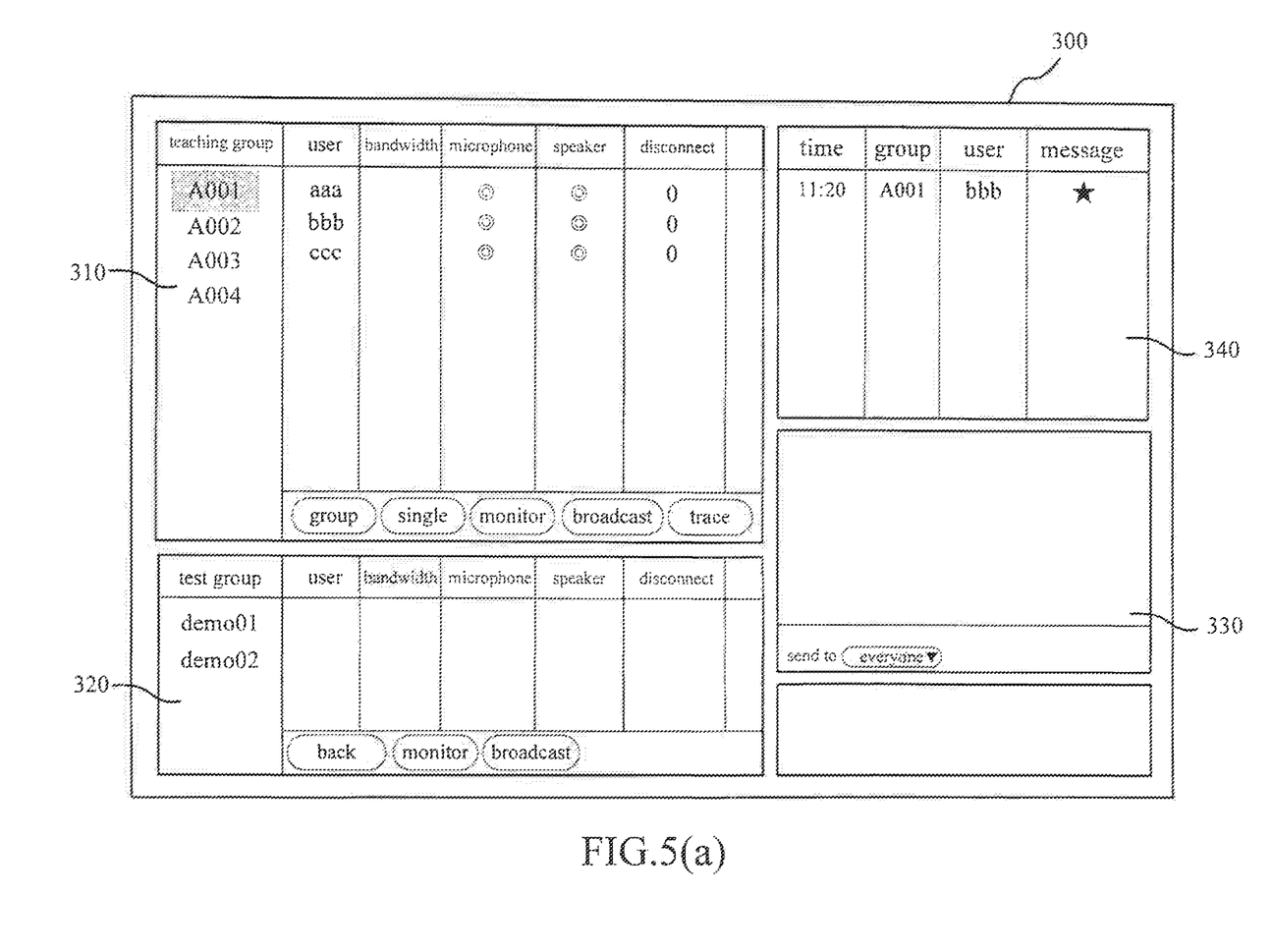
FIG. 5(a) and FIG. 5(b) are schematic diagrams showing a managing interface of the online interactive learning and managing system of the present disclosure.
Figure 5B:
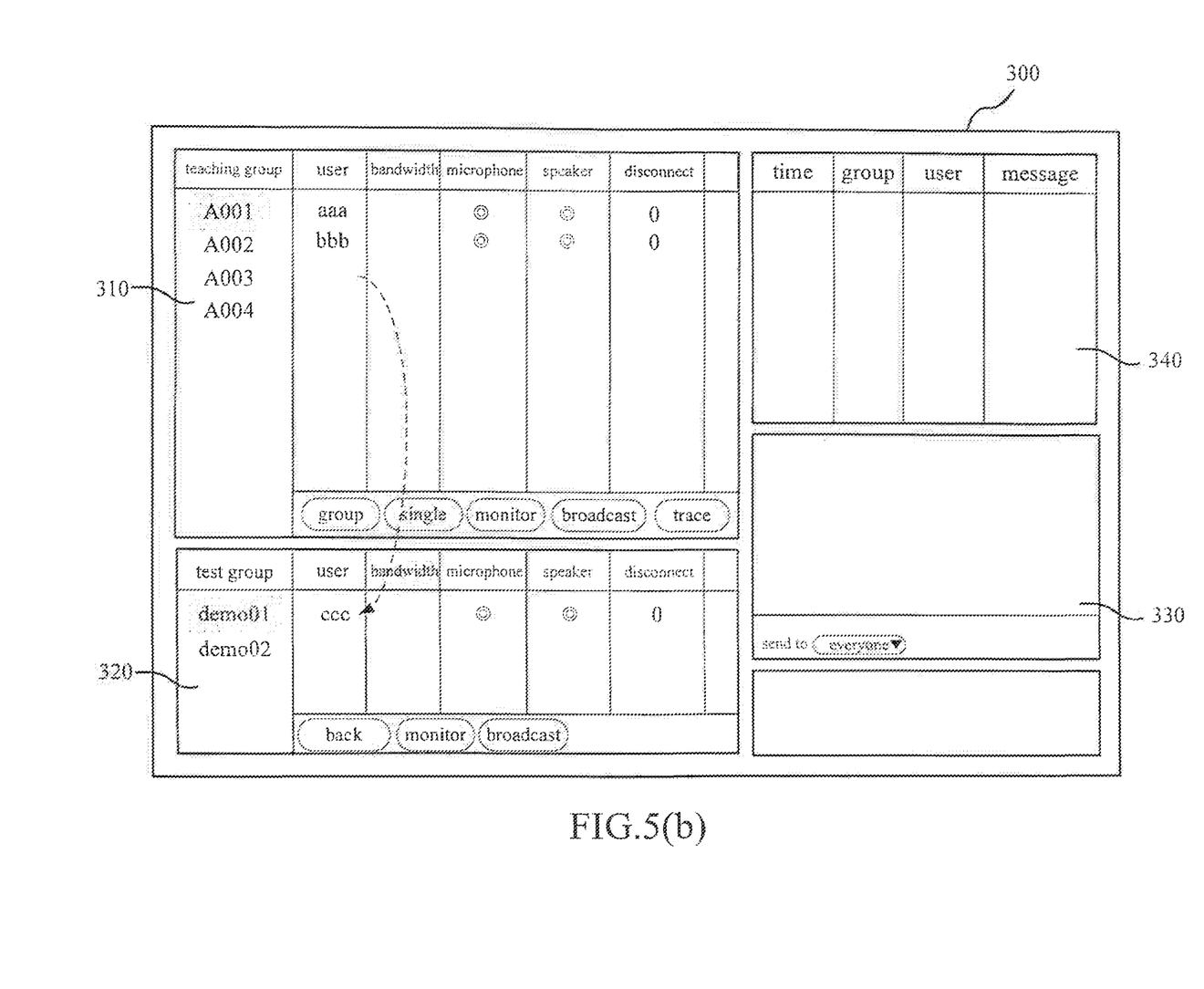

Please refer to FIG. 2, FIG. 5(a) and FIG. 5(b). FIG. 5(a) and FIG. 5(b) are schematic diagrams showing a managing interface 300 of the online interactive learning and managing system 1 of the present disclosure. As shown in FIG. 2 and FIG. 5(a), in various embodiments a managing interface 300 is formed when an administrator's account is logged into the online interactive learning and managing system 1. The administrator may monitor the situation of each teaching group or each user by the managing interface 300. The administrator may communicate with each user to help them to solve problems in operating the interface by the managing interface 300. The managing interface 300 comprises a teaching group managing area 310, a test group managing area 320, a real-time communication area 330, and a message display area 340. The teaching group managing area 310 displays status information of all the current users of each teaching group for managing by the administrator. The status information comprises a connection status of each user and a sound input/output status.

In some embodiments, the managing module 122 allows the administrator to monitor any teaching group or any user on the managing interface 300 and the current course situation of the teaching group or the user. When the administrator determines that a user disturbs the course, the administrator may input a command via the managing interface 300 and remove the user from the teaching group. In response to the command, the personalized operation interface 200a of the user may be closed. Conversely, the administrator may also restore a removed user back into the teaching group and activate the user's personalized operation interface 200a in order to continue with the course.

The managing module 122 receives one or more notifying messages from the analyzing module 129 indicative of microphone issues, classroom disturbances, or video issues. The managing module 122 generates a notifying message to the user inquiring about the particular issue. The user can then use the communication assistance function option 253 to respond to the notifying message and communicate with the teacher and the administrator to resolve the issue. The managing module 122 may automatically remove the user from the teaching group so that the issue may be resolved. The managing module 122 may subsequently restore a removed user back into the teaching group and activate the user's personalized operation interface 200a in order to continue with the course once the issue has been resolved. A monitoring module 127 allows the administrator to continue monitoring the teaching group to further remedy the situation, as will be described in greater detail below.

Please refer to FIG. 5(a) and FIG. 5(b). The test group managing area 320 is used to test the user's usage status. The test group managing area 320 may preset at least one test group (demo01 and demo02 as shown in FIG. 5(a) and FIG. 5(b)). When a user ccc within the teaching group encounters an operation problem (such as unclear audio or an unstable connection), the managing module 122 may remove the user ccc from its corresponding teaching group A001 of the teaching group managing area 310 and then place the user ccc into the test group demo01 of the test group managing area 320 according to the operation of the managing interface 300. At this point, the managing module 122 may disable the personalized operation interface 200a of the user ccc so that the administrator may proceed with related status testing for the user ccc to solve the problem. When the problem is solved, the administrator will indicate to the managing module 122 that the problem is solved. The managing module 122 receives input indicating that the problem has been resolved, and in response moves the user ccc from the test group demo01 of the test group managing area 320 back into the teaching group A001 of the teaching group managing area 310. Then the personalized operation interface 200a of the user ccc may be enabled for continuing with the course.

The real-time communication area 330 displays the messages typed by each administrator so that the administrators are able to communicate with one another. In various embodiments, multiple administrators manage a portion of the teaching groups if multiple learners log into the course at the same time. Therefore, the real-time communication area 330 provides a way for the administrators to communicate with one another and support one another in real time. The messages typed by any administrator in the real-time communication area 330 may also be sent to any specific user, and text messages sent from any personalized operation interface 200a may be displayed via the real-time communication area 330. Therefore, the user may privately communicate with the administrator.

The message display area 340 is used to display prompting messages. As shown in FIG. 5(a), when a user has a system operational problem or other unsolvable problems, the user may send a notification message via the communication assistance function option 253 of the personalized operation interface 200a. The notification message may be transmitted over the Internet and then received by the managing module 122. The managing module 122 may display a prompting message corresponding to the notification message via the message display area 340 of the managing interface 300. The prompting message includes which user has the problem and a description of the problem. The administrator may directly contact the user via the managing interface 300, or move the user into the test group for testing and analyze the problem by the abovementioned function. The prompting message displayed on the message display area 340 may display the user information of the user who sent the message, and display the descriptions or drawings of the problem (as indicated by a star sign as shown in FIG. 5(a) under "message"), such that the administrator may understand the problem immediately. As a result, the online interactive learning and managing system 1 of the present disclosure is able to solve the user's problem without disturbing the course.

When a system announcement (or an alert) needs to be broadcast to all the logged-in users, the administrator may send an announcement data via the managing interface 300. In some embodiments, the announcement data is received and processed by the teaching module 121 for display via each personalized operation interface 200a to notify all users.

As shown in FIG. 2 and FIG. 3, the software program 12a further comprises a monitoring module 127, which creates a monitoring interface 400 to help the administrator with controlling the status of the server 10 and the connection status of each user. The administrator may monitor and adjust the related settings of the system via the monitoring interface 400, e.g. online bandwidth settings, video size adjustments, a number of activated classes, or a number of users currently online. The monitoring module 127 further comprises a connection status storage module 128, which monitors the connection status of each user and stores each user's connection status data as a connection status record respectively for searching. The connection status data comprises one or more of a user connection address, a time record of log-in, log-out, an Internet flow bandwidth, and abnormal data.

In some embodiments, the monitoring module 127 monitors and analyzes the connection status of a computer of a user. The monitoring module 127 determines, based on the monitoring and analysis, if a user's connection status of a user's computer is unstable or if the user's computer is not connected to the on-line interactive learning and managing system 1. The monitoring module 127 retrieves connection status data of a single user or multiple users of the teaching group from the managing interface 300 or the monitoring interface 400. Once a connection status problem has been detected, the monitoring module can send a notifying message indicative of the connection status problem to the teaching module 121 and the managing module 122 such that the issue can be resolved. Accordingly, the problem may be identified as one that takes place at the user's side or one that takes place at the server's side by the connection status data to help to solve the problem.

Figure 6:
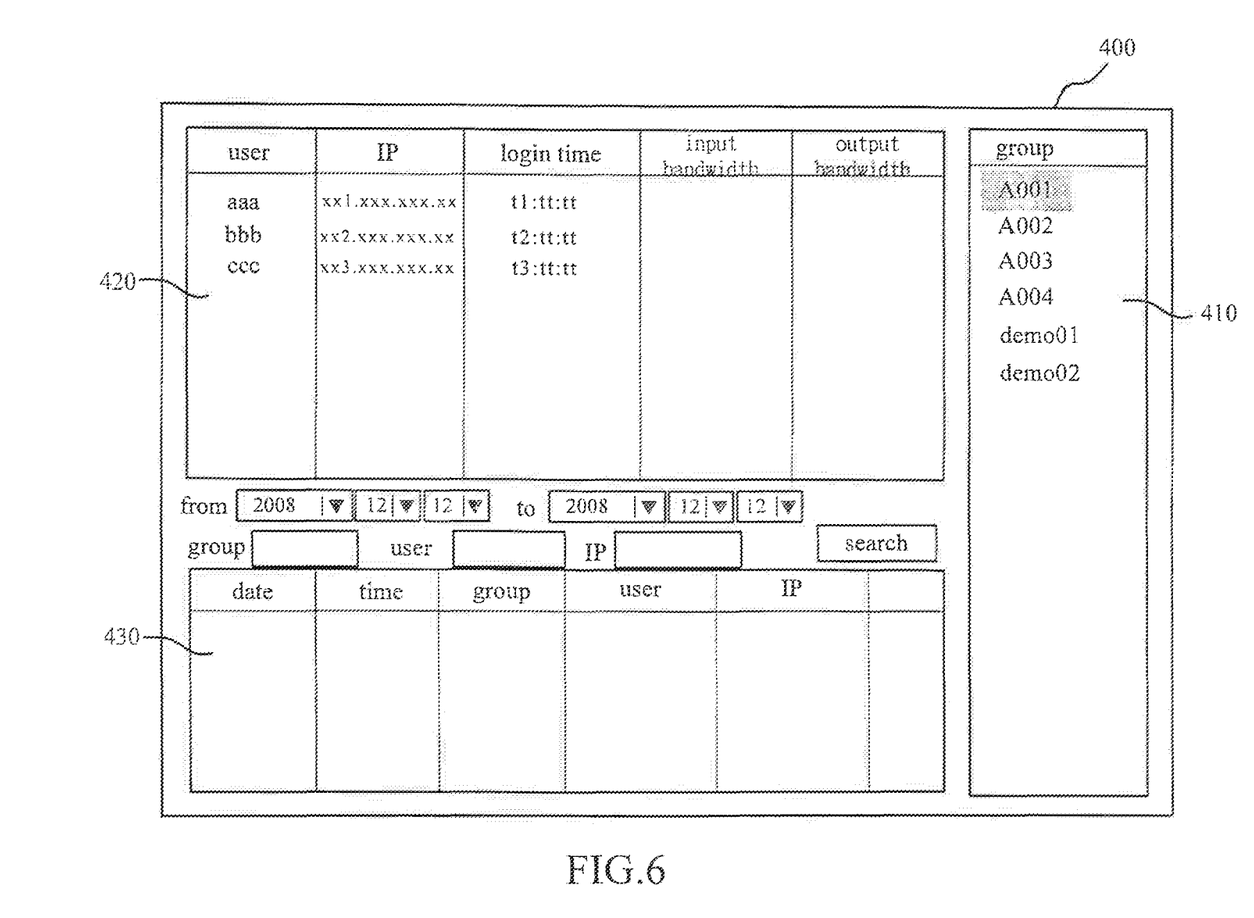
FIG. 6 is a schematic diagram showing a monitoring interface of the online interactive learning and managing system of the present disclosure.

Please refer to FIG. 6. FIG. 6 illustrates the diagram of the monitoring interface 400 of the online interactive learning and managing system 1 of the present disclosure. As shown in FIG. 6, the monitoring interface 400 comprises an online group display area 410 and a connection status display area 420. The online group display area 410 lists all existing groups currently within the system, including each teaching group or each testing group. The connection status display area 420 displays all connection status data of each user of the at least one group chosen by the online group display area 410 in real time. In some embodiments, the connection status data comprises a user account, a connection address, a time of log-in, and an Internet flow bandwidth, but the present disclosure is not restricted to these items.

The monitoring interface 400 further comprises a connection record search area 430. The monitoring interface 400 receives input search conditions (such as date, user name, or teaching group) via the connection record search area 430. The monitoring module 127 receives and uses the input search conditions to search all of the connection status data records of users stored in the connection status storage module 128. The connection status history data records corresponding to the input search conditions are displayed via the monitoring interface 400. Accordingly, the administrator may analyze and obtain all the related information easily.

The design of the online interactive learning and managing system 1 of the present disclosure allows users to directly log into the server 10 to learn interactively via each corresponding personalized operation interface 200a. The administrators logged into the server 10 may control and monitor every user via the managing interface 300 and the monitoring interface 400. When a user has a problem, the user and the administrator may communicate with each other via the personalized operation interface 200a and the managing interface 300. When a connection problem between any user's computer and the server 10 occurs, the administrator may efficiently analyze and identify the problem by the monitoring interface 400.

Although the present disclosure has been explained in relation to its preferred embodiments, it is also of vital importance to acknowledge that many other possible modifications and variations can be made without departing from the spirit and scope of the invention as hereinafter claimed.

What is claimed is:

1. An online learning management system for monitoring and maintaining operational integrity of online teaching groups having students and teachers distributed across a network, the online learning management system comprising:
   a managing interface coupled to at least one teaching group having a plurality of users, the plurality of users comprising at least one student and at least one teacher;
   a teaching module, coupled to a plurality of personalized operation interfaces corresponding to the plurality of users and coupled to the managing interface, the teaching module configured to manage communications between computing devices of the plurality of users over the network;
   a monitoring module, coupled to a monitoring interface and the teaching module, configured to monitor connection status data of each of the computing devices, determine a connection status of a given computing device of the computing devices based on the connection status data, and record the connection status data of the user as a connection status record for searching, the connection status data comprising at least two of: user connection address, a time record of logging-in and logging-out, and an internet flow bandwidth;

an analyzing module, coupled to the teaching module, configured to detect at least one of an operational problem or a disturbance of a user of the plurality of users based at least in part on the connection status data, and further configured to automatically generate a notifying message indicative of the at least one of the operational problem or the disturbance; and a managing module, coupled to the management interface, configured to receive the notifying message from the analyzing module indicative of the at least one of the operational problem or the disturbance, remove the user from the at least one teaching group, and insert the user into a test group managing area, and further configured to analyze and correct the at least one of the operational problem or the disturbance, and to return the user to the at least one teaching group in response to correcting the at least one of the operational problem or the disturbance.

2. The system of claim 1, wherein the managing module receives a message from the teaching module via at least one personalized operation interface of the plurality of personalized operational interfaces and displays the message on the managing interface.

3. The system of claim 2, wherein the teaching module receives a message from the managing module via the managing interface and displays the message on the at least one personalized operation interface, allowing for communication between an administrator and the user via the personalized operation interface and the managing interface.

4. The system of claim 1, wherein the plurality of personalized operation interfaces include a status display area, a real-time communication area, an interaction display area, a video display area, and an interface function settings area.

5. The system of claim 4, wherein the interface function settings area includes a communication assistance function option, at least one personalized operation interface of the plurality of personalized operation interfaces receiving, via the communication assistance function option, at least one of:
an indication of a problem with learning directed to the teacher;
an indication of a problem with the at least one personalized operation interface directed to the administrator; and
a response to a reported problem.

6. The system of claim 1, wherein the analyzing module is coupled to a microphone of a computing device of the computing devices, the analyzing module configured to receive and analyze an audio signal from the microphone.

7. The system of claim 6, wherein the analyzing module is connected to a video camera of the computing device, the analyzing module configured to receive and analyze a video signal from the video camera.

8. The system of claim 7, wherein the analyzing module detects the at least one of the operational problem or the user disturbance based on the audio signal, the video signal, or a combination thereof.

9. The system of claim 6, wherein the analyzing module is configured to convert the audio signal into a speech-to-text transcript.

10. The system of claim 1, wherein the managing module, after receiving the notifying message from the analyzing module, is configured to generate a return notifying message inquiring about the at least one of the operational problem or the user disturbance, and to transmit the return notifying message to a personalized operation interface of the user.

11. A computer-implemented method for monitoring and maintaining the operational integrity of online teaching groups having a plurality of users, the plurality of users comprised of at least one student and at least one teacher distributed across a network, the method comprising:
monitoring a connection status between a computing device of a user of the plurality of users and an online teaching group, the connection status indicative of a connection between the computing device and the teaching group;
storing connection status data of the user as a connection status record for searching, the connection status data comprising at least two of: user connection address, a time record of logging-in and logging-out, and an internet flow bandwidth;
identifying at least one of an operational problem or a disturbance of a user within the teaching group based at least in part on the monitored connection status of the computing device of the user;
notifying the user of the at least one of the operational problem or the disturbance;
removing the user from the teaching group in response to the identifying at least one of the operational problem or the disturbance;
inserting the user into a test group managing area in response to the removing the user from the teaching group;
disabling the connection of the user between the computing device of the user and the teaching group in response to the removing of the user from the teaching group;
facilitating diagnosis and correction of the at least one of the operational problem or the disturbance;
returning the user to the teaching group in response to correction of the at least one of the operational problem or the disturbance; and
restoring the connection of the user between the computing device of the user and the teaching group in response to returning the user to the teaching group.

12. The computer-implemented method of claim 11, further comprising:
receiving a first message from a personalized operation interface via the computing device of the user; and
displaying the first message on a managing interface.

13. The computer-implemented method of claim 12, further comprising:
receiving a second message from the managing interface; and
displaying the second message on the personalized operation interface.

14. The computer-implemented method of claim 11, further comprising:
displaying, via a managing interface, at least one of the following: connection status information of the plurality of users, text messages provided by the plurality of users, and video images captured by the at least one teacher.

15. The computer-implemented method of claim 11, further comprising:
receiving at least one of: an indication of a problem with learning directed to the at least one teacher, an indication of a problem with a personalized operation interface directed to the administrator, and a response to a reported problem.

16. The computer-implemented method of claim 11, further comprising:
receiving and analyzing an audio signal from a microphone coupled to the computing device.

17. The computer-implemented method of claim 16, further comprising:
receiving and analyzing a video signal from a video camera coupled to the computing device.

18. The computer-implemented method of claim 17, wherein identifying the at least one of the operational problem or the disturbance is based on the analyzing of the audio signal, the video signal, or a combination thereof.

19. The computer-implemented method of claim 16, further comprising:
converting the audio signal into a speech-to-text transcript.

20. The computer-implemented method of claim 11, further comprising:
receiving a notifying message indicative of the at least one of the operational problem or the disturbance from the computing device of the user; and
generating a return notifying message to the user inquiring about the at least one of the operational problem or the disturbance.

* * * * *